United States Patent [19]

Braddock

[11] Patent Number: 5,297,526
[45] Date of Patent: Mar. 29, 1994

[54] GLOW-PLUG ENGINE

[76] Inventor: Douglas J. Braddock, 8415 Sweet Pine Ct., Springfield, Va. 22153

[21] Appl. No.: 97,625

[22] Filed: Jul. 27, 1993

Related U.S. Application Data

[63] Continuation of Ser. No. 859,169, Mar. 27, 1992, abandoned.

[51] Int. Cl.$^5$ ............................ F02M 37/04; F16K 7/04
[52] U.S. Cl. .................... 123/510; 123/DIG. 3; 123/579; 251/8; 261/36.2
[58] Field of Search ............... 123/510, 511, 512, 513, 123/460, 462, 579, 580, DIG. 3; 251/6, 7, 8; 261/34.1, 36.1, 36.2, 21, 71, 72.2

[56] References Cited

U.S. PATENT DOCUMENTS

| | | | |
|---|---|---|---|
| 2,256,948 | 9/1941 | Lloyd | 123/DIG. 3 |
| 2,315,183 | 3/1943 | Bicknell | 123/579 |
| 2,353,269 | 7/1944 | Roth | 123/510 |
| 2,609,187 | 9/1952 | Scott | 123/579 |
| 2,908,476 | 10/1959 | Hidding . | |
| 3,002,510 | 10/1961 | Wonneman | 123/DIG. 3 |
| 3,086,580 | 4/1963 | Capehart | 123/510 |
| 3,701,513 | 10/1972 | Carter . | |
| 3,734,072 | 5/1978 | Yamda | 123/DIG. 3 |
| 3,824,974 | 7/1974 | La Flame | 123/511 |
| 3,991,143 | 11/1976 | Carter . | |
| 4,044,744 | 9/1977 | Keefer | 123/510 |
| 4,055,609 | 10/1977 | Phelps | 261/36 A |
| 4,186,707 | 2/1980 | Driggers | 123/512 |
| 4,569,502 | 2/1985 | Elliott . | |
| 4,616,801 | 10/1986 | Cewers et al. . | |
| 4,787,406 | 11/1988 | Edwards et al. . | |
| 4,957,072 | 9/1990 | Goldowsky | 123/DIG. 3 |

FOREIGN PATENT DOCUMENTS 133010  3/1948  Australia ............................ 123/510

*Primary Examiner*—Carl S. Miller
*Attorney, Agent, or Firm*—Sixbey, Friedman, Leedom & Ferguson

[57] ABSTRACT

An improved glow-plug engine for use with a model airplane of the type that includes an output shaft for driving a propeller, a needle valve for controlling a flow of fuel into a carburetor, and a fuel line formed from resilient silicone rubber is provided, wherein the improvement comprises a pinch valve for controlling the flow of fuel through the fuel line which is located farther away from the propeller than the needle valve so that the fuel flow may be adjusted by the fingers of the engine's operator more safely. The pinch valve includes a valve body for securing a section of the resilient fuel line, and a pinching mechanism including a control member that is accurately extendible toward and retractable from a secured section of the fuel line to constrict or expand the fuel flow path defined by the secured section of the fuel line. In one embodiment, control member is a cam mounted on a lever which in turn is linked to a servo-mechanism. In another embodiment, the control member is a threaded rod that clampingly engages the section of tubing secured by the valve body. The pinch valve may be conveniently retrofitted on a conventional model airplane engine and used in combination with the needle valve, or it may supplant the needle valve.

29 Claims, 3 Drawing Sheets

GLOW-PLUG ENGINE

This application is a Continuation of Ser. No. 07/859,169, filed Mar. 27, 1992, now abandoned.

BACKGROUND OF THE INVENTION

This invention generally relates to an improved glow plug engine, and is specifically concerned with an improved model airplane engine of the type having a propeller on an output shaft and a needle valve for controlling the fuel-to-air mixture entering the carburetor, wherein the improvement comprises the use of a pinch valve on the fuel line in lieu of the needle valve for regulating the fuel-to-air mixture entering the carburetor which is spaced away from the propeller a greater distance than the needle valve.

Needle valves for regulating the fuel-to-air mixture entering the carburetor of a glow-plug engine, such as a model airplane engine, are well known in the prior art. Such needle valves generally comprise a shaft having a very fine screw thread around its exterior surface, and a tapered, needle-like member at its distal end which is reciprocally movable across a fuel path defined within the body of the engine. The fine screw thread associated with such needle valves allows a precision adjustment to be made as to the size of the fuel opening in the engine. Such needle valves further include either a spring rachet or an adjustable drag nut to keep the valve from backing out as a result of the considerable vibration they are subjected to during the operation of the engine.

While such needle valves are capable of performing their intended purpose of precisely achieving and maintaining a desired fuel-to-air mixture, the applicant has observed a number of shortcomings associated with such valves. One major shortcoming involves cost. While the operation of a needle valve is a simple enough concept, such valves require the manufacture and assembly of a number of precision-made components, including the fine screw thread used to adjust the position of the valve, and the previously mentioned spring rachet or adjustable guard nut assemblies to secure the screw shaft of the valve in the desired location after adjustment. A second shortcoming associated with the use of such valves in glow-plug engines is that the location of the needle valve is often unsafe and inconvenient when the glow-plug engine is mounted in a model car, boat or airplane. Often the engine housings used in such models must be modified to provide access to the needle valve of the engine.

Other major shortcomings arise specifically in the context of model airplane engines having an output shaft which terminates in a propeller. The needle valves used in these engines are usually located quite close to the rotating propellers of these engines, forward of the cylinder. Such close distancing has resulted in injuries ranging from cut to severely injured fingers, damaged tendons, and major loss of blood. Moreover, both the frequency and severity of these injuries appears to be increasing as a result of two factors. First, while in the past such model aircraft engines typically had a displacement between 0.30 and 0.60 cubic inches, the average size of such engines is getting larger. Presently, there are a number of model airplane engines of 1-2 cubic inches in displacement, which generates several horsepower. Secondly, the use of carbon-fiber reinforced plastic propellers has exacerbated the injuries caused by such engines, since such propellers are relatively sharper edged than the wooden propellers which were used more frequently in the past. Additionally, such carbon-reinforced plastic propellers will not break as easily as wooden propellers when they strike an object, which increases the likelihood that the propeller will break a finger or other body part placed in its way before it will itself be broken.

Another shortcoming associated with needle valves used in model airplane engines is the lack of adjustability of the fuel-to-air mixture regulated by the needle valve once the model airplane is in flight. Optimizing the fuel-to-air mixture in most model engines is often a delicate and difficult task, requiring a considerable amount of time with trial-and-error adjustment of the needle valve. The optimality of this setting changes from day to day, or even in the same day, as atmospheric conditions change. Consequently, many modelers, in their efforts to obtain maximum performance, spend considerable time adjusting the needle valve prior to each flight. The lack of any means to re-set the needle valve after the model airplane is in flight often results in the flight being executed with a less than optimum fuel-to-air ratio, which can cause engine damage or cause the model's engine to stop running, which sometimes results in a crash. In competitions, the lack of any way to readjust a poorly adjusted valve results in a loss of points which can cost the modeler the contest. Additionally, the competitors are often tempted to continue a flight with a poorly adjusted valve when they could have landed the model safely before the engine quit entirely. Such situations have resulted in the destruction of many valuable models.

Although there has been some recognition of the safety shortcoming, and although there have been solutions to this problem proposed and attempted, there has never been a satisfactory solution that would overcome all of these shortcomings. While there have been various devices proposed and tried for keeping the needle valve in its usual position and putting the adjustment means at some distance, such as the use of a flexible cable, gears, pulleys, etc., these devices all have major drawbacks such as cost, complexity, bulkiness, etc., and often do not allow for the precise adjustment necessary due to the "wind-up" characteristics associated with such drive trains. While it is possible to mount a needle valve separately from the carburetor by means of a tube disposed between the valve and the carburetor, this feature is available commercially only for relatively few engine models, and is expensive because a bracket and additional fuel line attachment means are necessary in addition to the needle valve, and because the needle valve must duplicate portions of the part of the carburetor which usually forms the female portion of the valve. It is also bulky and offers little flexibility in placement. Finally, there are commercially available needle valves which are capable of remote operation in combination with a servomechanism which can be added to some engines. However, they are quite expensive and are only applicable for a few specific engine models. Also, relatively few modelers have added this feature to their airplanes, because of the added installation complexity, the added expense, weight and space requirements of an additional servomechanism, and the fact that many radio systems, especially those used by beginners, are not equipped with the additional adjustable channel required. Further, such servo-controlled needle valves cannot be used with model airplanes which are not radio controlled.

Clearly, there is a need for an improved model airplane engine having a valve for controlling the flow of fuel into the carburetor of the engine which can be adjusted at a location which is at least more remote from the rotating propeller than the location where the needle valves are typically located, and which could also be adjusted after the model airplane is in flight so that fuel-to-air optimality could be easily maintained at all times. It would further be desirable if the valve associated with such an improved engine could be easily and precision-adjusted without the need for any flexible cables or expensive gear trains and without any intervening "wind-up" problems. Ideally, such a valve could be mounted at a variety of locations with respect to the engine so that the valve could be easily accessed and operated no matter what shape or form the engine mounting or cowls took. Finally, it would be highly desirable if the valve used in conjunction with such an engine could be easily retrofitted on any prior art model airplane engine with a minimum amount of mounting hardware and effort, and was inexpensive to manufacture and to install, and provided a highly accurate and reliable fuel flow adjustment that was easy to operate.

SUMMARY OF THE INVENTION

Generally speaking, the invention is an improved glow-plug engine that fulfills all of the aforementioned criteria. The improved engine is of the type that includes an output shaft, a carburetor, a needle valve for controlling a flow of fuel into the carburetor, and a fuel conduit formed from a flexible, resilient material for conducting fuel into the carburetor, wherein the improvement comprises a pinch valve for controlling the flow of fuel through the conduit. In the preferred embodiment, the pinch valve means is located farther away from the output shaft than the needle valve so that the flow of fuel into the carburetor may be adjusted by the fingers of the operator from a safer position that is farther away from the output shaft than the needle valve. The pinch valve advantageously exploits the highly resilient properties of the thick walled silicone tubing that is typically used to supply fuel to glow-plug engines by rendering a section of the conduit into an accurately adjustable valve element. The invention finds particular utility when used in conjunction with a glow-plug engine having a particularly hazardous mechanism on its output shaft such as the propeller of a model airplane.

The pinch valve includes a means for captively supporting a section of the fuel conduit despite the application of vibrational, inertial, and gravitational forces on the conduit during the operation of the engine in order to insure that the combination of the pinch valve and the resilient conduit will maintain a desired, consistent flow rate of fuel during the operation of the engine. To this same end, the pinch valve means further comprises a pinching mechanism including a control member that is accurately extendible toward and retractable from the section of the fuel conduit captively supported by the valve body in order to accurately constrict or expand the fuel flow path defined by the conduit section.

The control member of the pinching mechanism may be a cam means pivotally mounted with respect to the valve body and having a surface that is extendible toward and retractable from the conduit section held captive within the valve body when the cam means is pivotally moved. The pinching mechanism may further include a lever means connected at one end to the cam means, and connected to its free end to, for example, a servomechanism of a radio controlled model airplane. One or more set screws may be included in the pinching mechanism for determining the size of the angle that the servo-control may move the free end of the lever means, which in turn controls the flow rate range of the fuel admitted through the fuel conduit.

Alternatively, the pinching mechanism may include a threaded shaft threadedly engaged in the valve body and having a distal end that is extendible or retractable from the section of the conduit captively secured by the valve body. The threaded shaft may include a pad mounted on the distal end of the threaded shaft for applying uniform pressure across the conduit section. Preferably, this pad is fixedly secured to the distal end of the threaded shaft so that the rotational movement of the shaft is transferred to the pad. Such a configuration conveniently exploits the frictional engagement between the conduit section and the pad to help maintain the distal end of the threaded rod in the same position relative to the conduit section despite vibrational forces applied thereto by the operation of the engine. Finally, one or both of the valve body or the threaded rod is preferably formed from a plastic material, such as nylon, to increase the frictional forces between the threaded rod and the valve body to provide additional security to the threaded rod against spurious rotation caused by the vibrational forces generated by the operating engine.

BRIEF DESCRIPTION OF THE SEVERAL FIGURES

DETAILED DESCRIPTION OF THE PREFERRED EMBODIMENT

Figure 1:
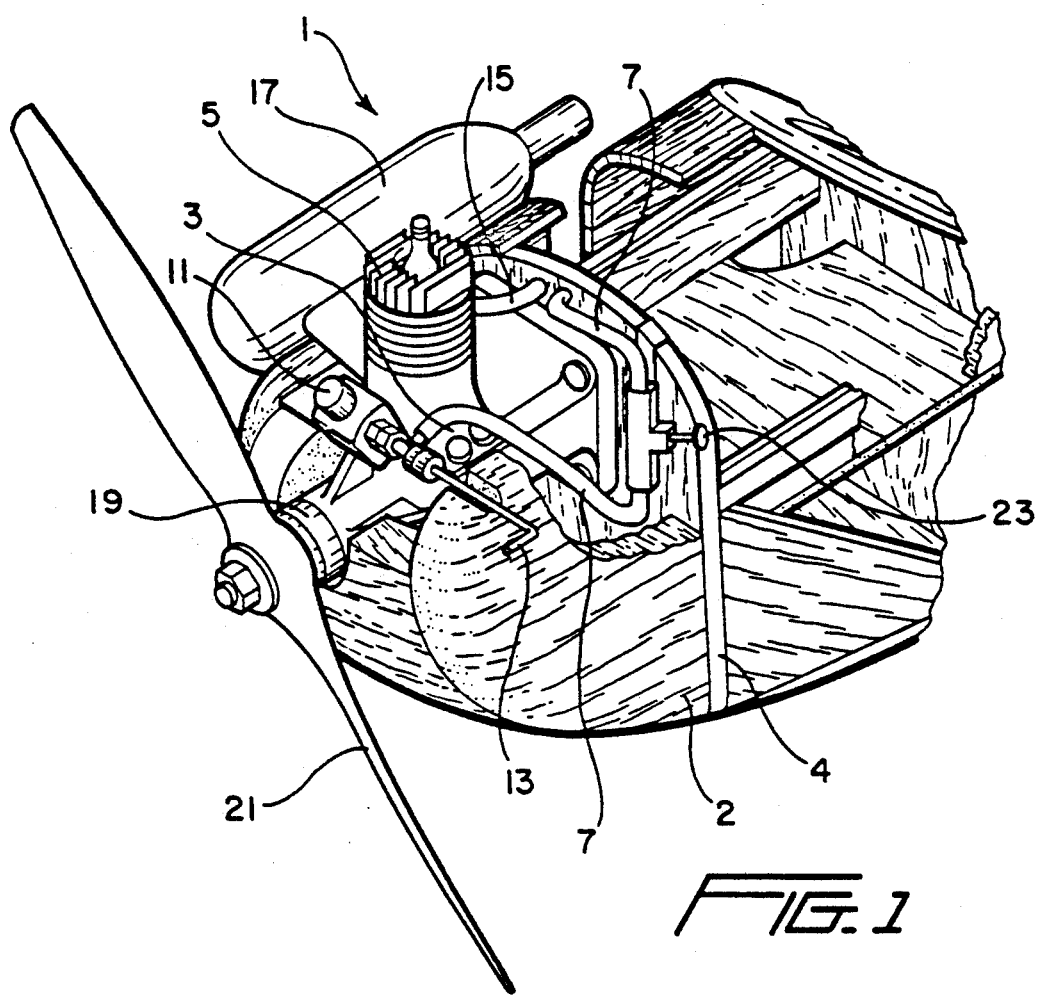
FIG. 1 is a perspective view of one embodiment of the improved model airplane engine of the invention which includes a manually-controlled pinch valve assembly mounted on the firewall of a model airplane.
Figure 2:
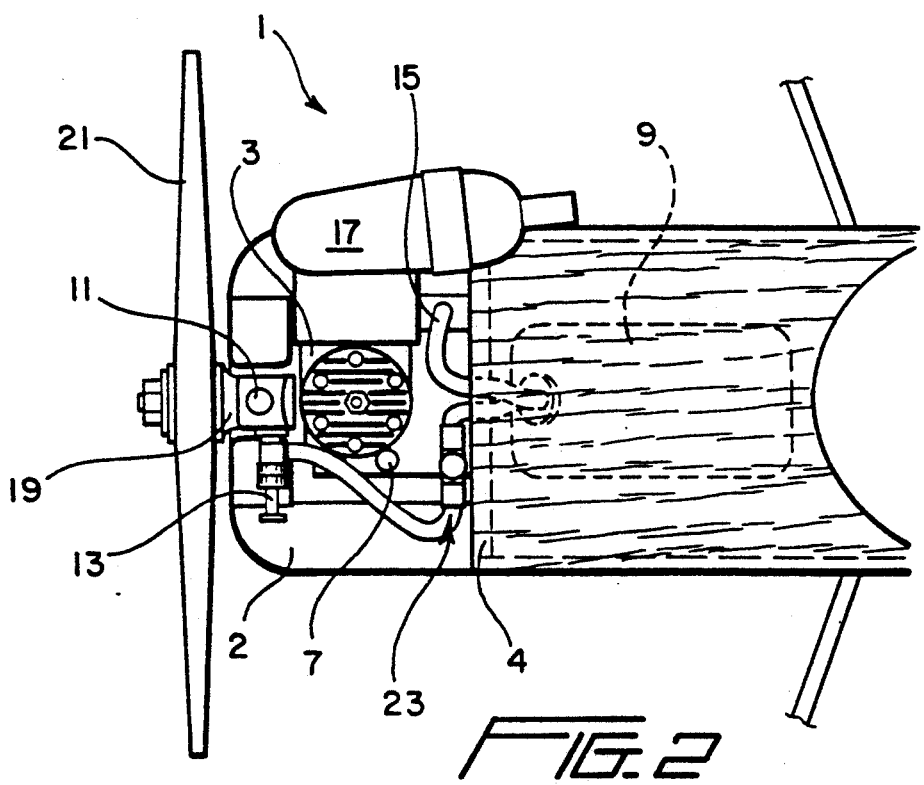
FIG. 2 is a plan view of an alternate embodiment of the improved model airplane engine of the invention, having a manually controlled pinch valve assembly mounted on the engine block.

With reference now to FIGS. 1 and 2, the improved glow-plug engine 1 of the invention is particularly adapted for use in a model airplane. Some engines are normally surrounded by a cowl and include an engine block or crank case 3 mounted onto a motor mount, which in turn is secured onto the fire wall 4 of such an airplane. The engine 1 typically includes a single cylinder 5 disposed on top of the engine block 3 as shown, and a fuel line 7 formed from thick-walled silicone rubber leading from a fuel tank 9 located behind the fire wall 4 to a carburetor 11 which feeds a mixture of air and fuel into the single cylinder 5. By "thick-walled" is meant a tube wherein the radial thickness of the walls is equal to or greater than the radius of the internal opening. A needle valve 13 may be provided on the carburetor 11 for determining the fuel-to-air ratio which is conducted into the cylinder 5. At the rear of the engine block 3, a pressure line 15 conducts pressure from a muffler 17 to the fuel tank to help the engine 1 run consistently. At the front of the engine block 3, an output shaft 19 is provided which is connected at one end to a crank shaft (not shown) linked to a piston which reciprocates within the cylinder 5, and at the other end to an output shaft propeller 21. In FIG. 1, the improved model airplane engine 1 of the invention includes a manually-controlled pinch valve assembly 23 positioned around the fuel line 7 and mounted on the fire wall 4 by way of a bracket, while the alternate embodiment of the engine 1 illustrated in FIG. 2 includes a manually controlled pinch valve assembly 23 positioned around the fuel line 7 of the engine and attached to a bracket which is attached to the rear of the enginer block 3. As will be described in more detail hereinafter, the provision of such a pinch valve assembly 23 in combination with the model airplane engines 1 illustrated in FIGS. 1 and 2 allows the operator of the engine to control the ratio of the fuel-to-air mixture entering the cylinder 5 from a position which is much more remote from the propeller 21 than the location of the needle valve 13, which in both cases is disposed in front of the cylinder 5 directly adjacent to the rotating propeller 21.

Figure 3:
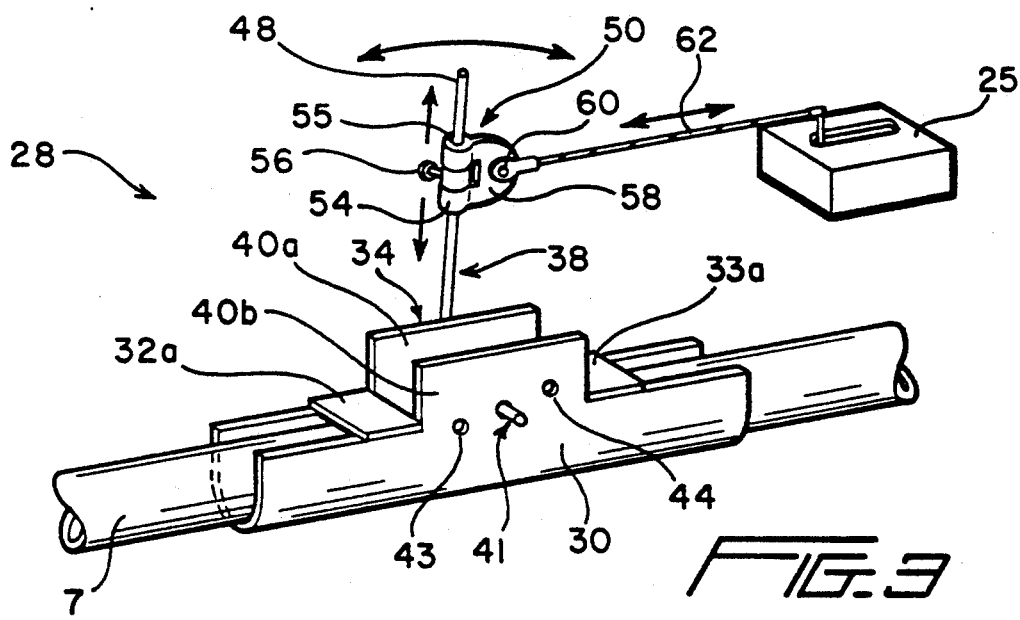
FIG. 3 is a perspective view of a servo-controlled embodiment of the pinch valve assembly of the invention.
Figure 4:
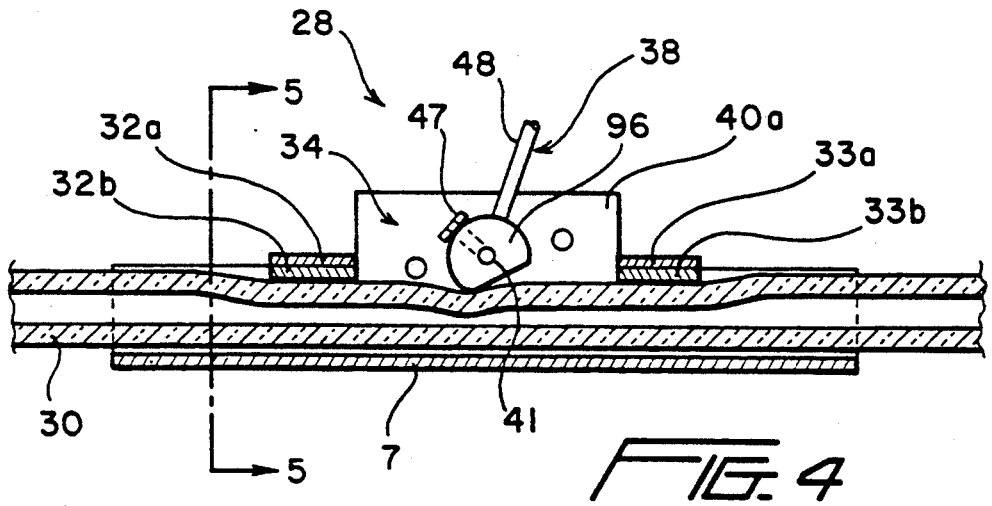
FIG. 4 is a cross sectional side view of the servo-control pinch valve assembly illustrated in FIG. 3.
Figure 5:
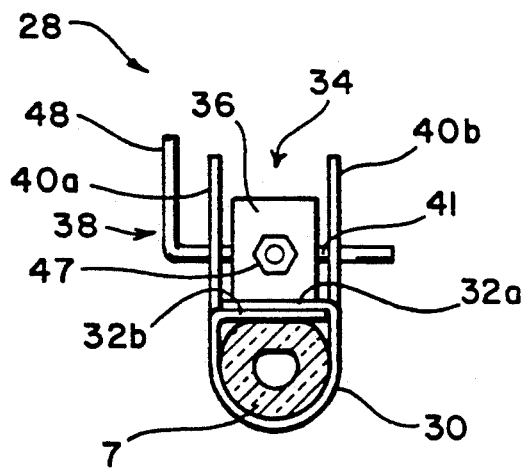
FIG. 5 is an end view of the servo-control pinch valve assembly illustrated in FIG. 4 along the line 5—5.

FIGS. 3, 4 and 5 illustrate a servo-controlled embodiment 28 of the pinch valve assembly of the invention. This embodiment 28 includes a valve body 30 which may be conveniently formed out of either a plastic such as nylon, or sheet metal, and which may have a D-shaped cross section for receiving and supporting a section of the fuel line 7. When the valve body 30 is formed from sheet metal, it includes two pairs of overlapping tabs 32a,b and 33a,b which may be manually folded downwardly in the position illustrated. Such tabs captively secure the fuel line 7 within the valve body 30 to prevent the fuel line 7 from moving with respect to the body 30 as a result of engine vibration, or inertia due to the movements of the model, gravity, or the forces applied to the fuel line 7 by the pinching mechanism 34 associated with the pinch valve assembly 28, which will be described directly.

Further with respect to FIGS. 3, 4 and 5, the pinching mechanism 34 of the servo-controlled pinch valve assembly 28 includes a cam 36 which may have the form of a flattened wheel which centrally engages the section of the fuel line 7 captively secured within the valve body 30 by the previously described tabs. The cam 36 is angularly moved by means of an L-shaped lever 38 pivotally mounted on a pair of opposing flanges 40a, 40b which extend up from the middle of the valve body 30 as shown. The L-shaped lever 30 includes a lever head 41 which is journaled across a pair of bores 42 located in the opposing flanges 40. Preferably, at least two other sets of bores 43 and 44 are included in the opposing flanges 40a,b so that the pinching mechanism 34 can accommodate, and reliably operate, in combination with engines of various sizes and fuel lines having different outer diameters. A cam 36 includes a set screw 47 which not only serves to secure the cam 36 to the lever head 41, but which also provides a means for adjusting the angle of the cam 36 with respect to the head 41. The set screw 47, by affixing the cam 36 onto the lever head 41, further performs the important function of preventing the lever head 41 from being pulled out of the journal bores 42.

The L-shaped lever 38 further includes a lever arm 48 having a coupling 50 for connecting the arm 48 to the output rod of a servo-controller 25. The coupling 50 includes a cylindrical member 54 having a bore 55 which slidably receives the arm 48. The cylindrical member 54 includes a set screw 56 for securing the coupling 50 at a desired location along the longitudinal axis of the arm 48. Such an adjustment is significant, as it determines the size of the angle that the servo-controller 25 may pivot the lever arm 48 (i.e., the lower that the cylindrical member 54 is secured onto the lever arm 48, the larger this angle will be). A tab 58 having a bore 60 links the lever arm 48 with the output shaft 62 of the servo-controller 25 in the manner shown.

Figure 6:
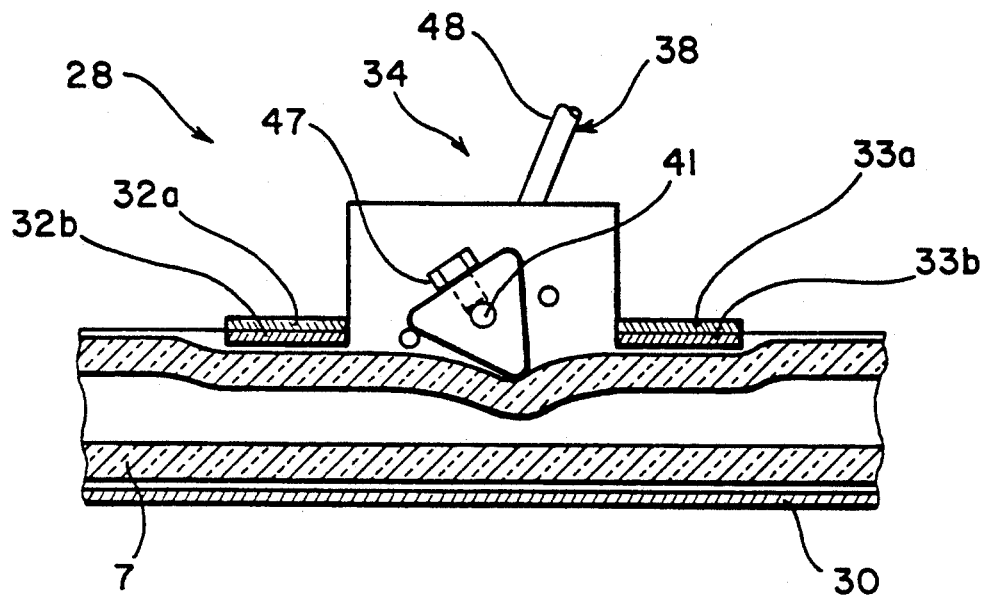
FIG. 6 is a cross sectional side view of the servo-control pinch valve assembly illustrated in FIG. 3, illustrating the use of a triangularly shaped cam.

FIG. 6 illustrates a variation of the servo-control pinch valve assembly 28 wherein the cam is triangularly shaped. Such a triangular shape is advantageous in instances where the engine operator wants to amplify the amount of pinching force that the servo-control 25 applies to the fuel line 7 throughout the stroke of its reciprocating output shaft 62.

Figure 8:
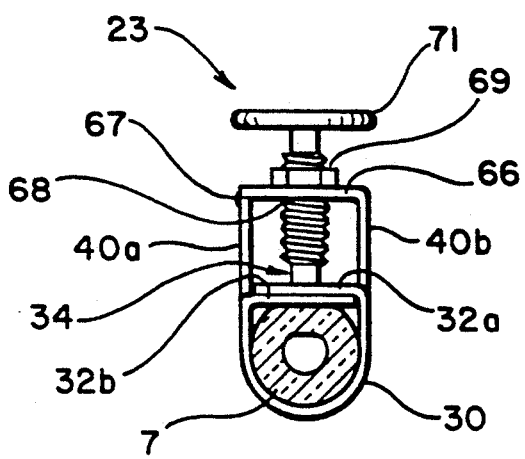
FIG. 8 is an end view of the manually controlled pinch valve assembly illustrated in FIG. 7 along the line 8—8.
Figure 7:
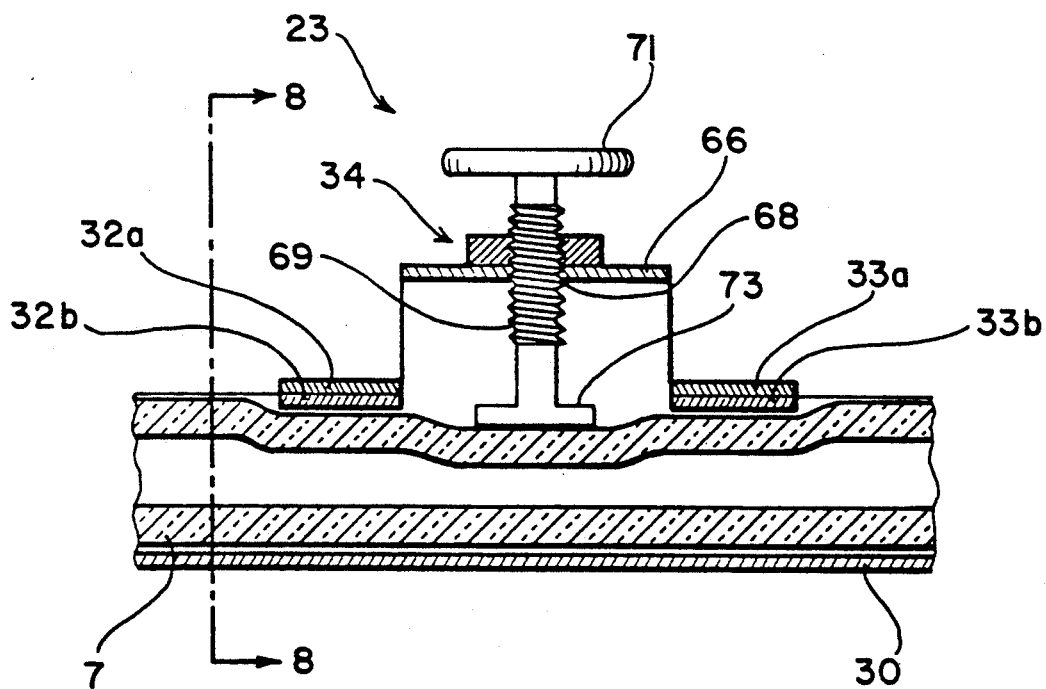
FIG. 7 is a cross sectional side view of the manually controlled pinch valve assembly used in the first and second embodiments of the invention.

FIGS. 7 and 8 disclose the pinching mechanism 34 used in the manually controlled pinch valve assembly 23 present in the first and second embodiments of the invention 1. In this alternate embodiment, the pinching mechanism 34 comprises a screw supporting tab 66 in the body 30 of the valve which bridges the upper edges of the two parallel, opposing flanges 40a,b. The free end of the screw supporting tab 66 may be brazed at 67 to the upper edge of the flange 40a as shown. The screw supporting tab 66 includes a nut having a bore 68 which is engaged to a threaded shaft 69. A thumb screw 71 is provided at the approximal end of the threaded shaft 69, while a pad 73 is provided at its distal end. The pad 73 is integrally formed at the end of the threaded shaft 69 so that the reaction force applied by the silicone rubber which forms the thick-walled fuel line 7 will be transmitted between the engaging threads of the shaft 69 and the bore 68. The application of such a reaction force will discourage the threaded shaft 69 to rotate in response to the vibration and inertial forces applied to the pinching mechanism 34 during the operation of the engine 1. The provision of the pad 73 allows the threaded shaft 69 to apply a uniform compression force across the diameter of the silicone rubber fuel line 7, which not only results in a smoother pinching effect, but further lengthens the life of the tubing forming the fuel line 7 by spreading the forces of compression over a broader area (thereby reducing the application of local stresses on the fuel line 7).

With respect to the operation of the embodiment 28 of the engine which includes the servo-control pinch valve assembly 23, the valve body 30 of the assembly 23 is first secured onto a desired section of the fuel line 7 by receiving the fuel line into the D-shaped bottom portion of the valve body 30, and then by bending the tabs 32a,b and 33a,b downwardly into the positions illustrated in FIGS. 3, 4 and 5 in order to secure the valve body 30 onto the fuel line 7. The operator of the engine then selects (by trial and error) which of the three pairs of bores 42, 43 or 44 that he desires to journal the lever head 41 in. The journaling of the lever head 41 into the bores 43 will result in a maximum pinching action, while the journaling of the head 41 into the bores 44 will result in a minimum of such a pinching action. Such trial and error selection is performed by placing the cam 36 between the two flanges 40a and 40b, and then sliding the distal end of the lever head 41 through the bore in the flange 40, the bore in the cam 36, and finally through the bore in the flange 40b. The set screw 47 is then tightened, and the pinching action of the cam 36 is then tested by pivotally moving the lever arm 48 with the servo-controller 25. The cylindrical member 54 of the coupling 50 may then be axially slid upwardly or downwardly with respect to the lever arm 48 to adjust the size of the angle that the servo-controller 25 pivotally moves the arm 48. During such tests, the needle valve 13 of the engine is preferably opened up somewhat from its normal position so that the ratio of fuel-to-air entering the carburetor 11 is determined exclusively by the servo-control pinch valve 28. Since this ratio is controlled by pinching the fuel line 7 by means of a servo-control 25, there is no need whatever for the fingers of the engine operator to be placed adjacent to the dangerous rotating propeller 21 shown in FIG. 1.

With respect to the operation of the manually controlled pinch valve assembly 23, the needle valve 13 is again opened up somewhat from its normal position (before the engine 1 is started) to allow the pinch valve assembly 28 to determine the ratio of fuel-to-air that enters the engine carburetor 11. In the embodiment of the engine illustrated in FIG. 2, the manually controlled valve assembly 23 is located adjacent to the fire wall 4, which is considerably further away from the dangerous rotating propeller 21 than the thumb wheel associated with the needle valve 13. Adjustment with this particular embodiment of the invention is much simpler than with the cam-operated, servo-controlled pinch valve assembly 28, as the proper fuel-to-air ratio can be found relatively quickly by turning the thumb wheel 71 located on the distal end of the threaded shaft 69. To further minimize the chance of any relative movement from occurring between the valve body 30 of either of the pinch valve assemblies 23 and 28 with respect to the fuel line 7, the valve body 30 of each should be secured to either the engine block 3, or to fire wall 4 of the model airplane in which the engine 1 is mounted. Such a mounting may be performed by, for example, a conventional bracket.

I claim:

1. An improved glow-plug machine engine of the type that includes an output shaft, a carburetor, a needle valve means in close proximity to said output shaft and being manually adjustable by an operator for controlling the ratio of fuel-to-air entering said carburetor, and a conduit formed from a flexible, resilient material for conducting fuel into the carburetor, wherein the improvement comprises: a pinch valve means more remotely located from the output shaft than the needle vale means for exclusively controlling the ratio of fuel-to-air entering the carburetor by controlling the flow of fuel through said conduit, and for obviating the need for an operator to place a hand in close proximity to said output shaft when making an adjustment of the fuel-to-air mixture.

2. An improved glow-plug engine as described in claim 1, wherein said conduit is formed from a silicone rubber, and said pinch valve means is located farther away from said output shaft than said needle valve means.

3. An improved glow-plug engine as described in claim 1, wherein said conduit is formed from a silicone rubber.

4. An improved glow-plug engine as described in claim 3, wherein said pinch valve means further comprises a pinching mechanism including a control member that is extendible toward and retractable from said section of fuel conduit secured by said valve body to constrict and expand a fuel flow path defined by said conduit section.

5. An improved glow-plug engine as described in claim 4, wherein said valve body includes means for captively supporting said fuel conduit section in the same orientation with respect to said control member despite the application of vibrational, inertial, forces on said conduit during the operation of the engine.

6. An improved glow-plug engine as described in claim 4, wherein said engine includes an output shaft onto which a propeller is mounted, and said improvement further comprises a means for mounting said valve body on said engine at a location farther away from said propeller than said needle valve.

7. An improved glow-plug engine as described in claim 4, wherein said engine includes an output shaft onto which a propeller is mounted, and said engine is mounted in the body of a model airplane, and said improvement further comprises a means for mounting said valve body on the frame of said model airplane at a location farther away from said propeller than said needle valve.

8. An improved glow-plug engine as described in claim 5, wherein said captive supporting means includes a sleeve for captively receiving said conduit section, and means for securing said valve body to said engine.

9. An improved glow-plug engine as described in claim 4, wherein said control member of said pinching mechanism is a cam means pivotally mounted with respect to said valve body and having a surface that is extendible toward and retractable from said conduit section when said cam means is pivotally moved.

10. An improved glow-plug engine as described in claim 9, wherein said pinching mechanism further includes a lever means connected to said cam means for pivotally moving said cam means.

11. An improved glow-plug engine as described in claim 4, wherein said control member includes a threaded shaft threadedly engaged in said valve body and having a distal end that is extendible and retractable from said conduit section.

12. An improved glow-plug engine as described in claim 11, wherein said threaded shaft includes a pad mounted on the distal end of the threaded shaft for applying uniform pressure across the conduit section.

13. An improved glow-plug engine as described in claim 10, wherein said pinching mechanism further includes a set screw for adjusting the angular position of said cam means with respect to said lever means.

14. An improved glow-plug engine as described in claim 10, wherein said pinching mechanism further includes a linkage means for linking the output of a servo-control with the lever means, wherein the position of said linkage means is adjustable along the axis of said lever means to control the degree to which said servo-control rotates said cam means.

15. An improved glow-plug engine of the type that includes an output shaft for driving a propeller, a needle valve means in close proximity to said output shaft for controlling the ratio of fuel-to-air entering a carburetor, and a fuel conduit formed from resilient silicone rubber, wherein the improvement comprises a pinch valve means for exclusively controlling the ratio of fuel-to-air entering said carburetor by controlling the flow of fuel through said conduit, said pinch valve means being located farther away from said output shaft than said needle valve means to obviate the need for an operator to place a hand in close proximity to said propeller when adjusting said fuel-to-air ratio entering said carburetor, and having a valve body for securing a section of said fuel conduit.

16. An improved glow-plug engine as described in claim 15, wherein said pinch valve means further comprises a pinching mechanism including a control member that is extendible toward and retractable from said section of fuel conduit secured by said valve body to constrict and expand a fuel flow path defined by said conduit section.

17. An improved glow-plug engine as described in claim 16, wherein said control member includes a threaded shaft threadedly engaged in said valve body and having a distal end that is extendible and retractable from said conduit section.

18. An improved glow-plug engine as described in claim 17, wherein said threaded shaft includes a pad mounted on the distal end of the threaded shaft for applying uniform pressure across the conduit section, said pad being fixedly connected to said threaded shaft so that rotary motion of the shaft is transferred to said pad so that the frictional engagement between said conduit section and said pad will prevent said shaft from rotating as a result of vibration from said engine.

19. An improved glow-plug engine as described in claim 17, wherein one of said threaded shaft and said valve body is formed from a plastic material to prevent said threaded shaft from rotating as a result of vibration from said engine.

20. An improved glow-plug engine as described in claim 16, wherein said control member of said pinching mechanism is a cam means pivotally mounted with respect to said valve body and having a surface that is extendible toward and retractable from said conduit section when said cam means is pivotally moved.

21. An improved glow-plug engine as described in claim 20, wherein said pinching mechanism further includes a lever means connected to said cam means for pivotally moving said cam means.

22. An improved glow-plug engine as described in claim 21, wherein said cam has a substantially flat surface that terminates in a rounded corner that engages said resilient fuel conduit.

23. An improved glow-plug engine as described in claim 15, wherein the radial thickness of the walls of said silicone rubber fuel conduit is equal to or greater than the radius of the flow path defined by the tube.

24. An improved glow-plug engine for use in a model airplane of the type that includes an output shaft for driving a propeller, a needle valve means for controlling a ratio of fuel-to-air entering a carburetor, and a fuel conduit formed from a resilient material, wherein the improvement comprises a pinch valve means for exclusively controlling the ratio of fuel-to-air entering the carburetor by controlling the flow of fuel through said conduit, said pinch valve means being located farther away from said output shaft than said needle valve means and having a valve body including a pinching mechanism including a control member that is extendible toward and away from a second of said conduit to constrict and expand the fuel flow path defined in said conduit section, and means for securing the section of said conduit adjacent to said control member to maintain said section in the same orientation with respect to said control member despite the application of vibration and inertial and gravitational forces on said conduit during the operation of said model airplane engine.

25. An improved glow-plug engine for use in a model vehicle of the type that includes an output shaft, a carburetor adjacent to said shaft, and a fuel conduit formed from a silicone material, wherein the improvement comprises a pinch valve means for exclusively controlling the ratio of fuel-to-air entering said carburetor by controlling the flow of fuel through said conduit, said pinch valve means being located remotely from said carburetor so that manual adjustments to the ratio of fuel-to-air entering the carburetor may be made without the need for an operator to place a hand in proximity to said output shaft, said pinch valve including a valve body, and a threaded shaft threadedly engaged in said valve body that is extendable and retractable from a section of said conduit for pinching said conduit and controlling the flow of fuel therethrough.

26. An improved glow-plug engine as described in claim 25, wherein the pinch valve means is located farther away from said output shaft than said carburetor.

27. An improved glow-plug engine for use in a model vehicle of the type that includes an output shaft, a carburetor adjacent to said shaft, and a fuel conduit formed from a silicone rubber, wherein the improvement comprises a pinch valve means for exclusively controlling the ratio of fuel-to-air entering said carburetor by controlling the flow of fuel through said conduit, said pinch valve means being located remotely from said carburetor so that manual adjustments to the ratio of fuel-to-air entering the carburetor may be made without the need for an operator to place a hand in proximity to said output shaft.

28. An improved glow-plug engine for use in a model vehicle of the type that includes an output shaft, a carburetor adjacent to said shaft, and a fuel conduit formed from a silicone rubber, wherein the improvement comprises a pinch valve means for exclusively controlling the ratio of fuel-to-air entering said carburetor by controlling the flow of fuel through said conduit, said pinch valve means being located remotely from said carburetor so that manual adjustments to the ratio of fuel-to-air entering the carburetor may be made without the need for an operator to place a hand in proximity to said output shaft, said pinch valve including a valve body and a threaded shaft threadedly engaged to said valve body, wherein said valve body has means for captively supporting a section of said fuel conduit in the same orientation with respect to said threaded shaft regardless of the application of vibrational and inertial forces on said conduit during the operation of the engine, and wherein a distal end of said threaded shaft is extendable and retractable from said section of said conduit for pinching said conduit and controlling the flow of fuel therethrough.

29. An improved glow-plug engine for use in a model vehicle of the type that includes an output shaft, and a carburetor adjacent to said shaft, wherein the improvement comprises a pinch valve means for exclusively controlling the ratio of fuel-to-air entering said carburetor by controlling the flow of fuel through said conduit, said pinch valve means being located remotely from said carburetor so that manual adjustments to the ratio of fuel-to-air entering the carburetor may be made without the need for an operator to place a hand in proximity to said output shaft, and a fuel conduit formed from a silicone rubber, and the radial thickness of the walls of the conduit are equal to or greater than the radius of the flow path defined by the conduit.

* * * * *